US012579175B2

(12) United States Patent
Kim et al.

(10) Patent No.: US 12,579,175 B2
(45) Date of Patent: Mar. 17, 2026

(54) METHOD AND DEVICE FOR GENERATING ANSWER TO NATURAL LANGUAGE QUESTION FOR DATA

(71) Applicants: Samsung Electronics Co., Ltd., Suwon-si (KR); The Royal Institution for the Advancement of Learning/McGill University, Montreal (CA)

(72) Inventors: Youngmin Kim, Suwon-si (KR); Hodong Lee, Suwon-si (KR); Jackie Cheung, Montreal (CA)

(73) Assignees: Samsung Electronics Co., Ltd., Suwon-si (KR); The Royal Institution for the Advancement of Learning/McGill University, Montreal (CA)

( * ) Notice: Subject to any disclaimer, the term of this patent is extended or adjusted under 35 U.S.C. 154(b) by 0 days.

(21) Appl. No.: 18/635,287

(22) Filed: Apr. 15, 2024

(65) Prior Publication Data

US 2025/0156454 A1     May 15, 2025

Related U.S. Application Data

(60) Provisional application No. 63/548,017, filed on Nov. 10, 2023.

(30) Foreign Application Priority Data

Dec. 11, 2023     (KR) ........................ 10-2023-0179124

(51) Int. Cl.
| | | |
|---|---|---|
| *G06F 16/00* | (2019.01) | |
| *G06F 16/3329* | (2025.01) | |
| *G06F 16/334* | (2025.01) | |

(52) U.S. Cl.
CPC ...... *G06F 16/3329* (2019.01); *G06F 16/3344* (2019.01)

(58) Field of Classification Search
CPC ........................ G06F 16/3329; G06F 16/3344
(Continued)

(56) References Cited

U.S. PATENT DOCUMENTS

| | | | |
|---|---|---|---|
| 11,386,095 B2 | 7/2022 | Ali et al. | |
| 11,500,865 B1 * | 11/2022 | Wang ..................... | G06N 3/045 |

(Continued)

FOREIGN PATENT DOCUMENTS

| | | | | |
|---|---|---|---|---|
| KR | 102267068 B1 * | 6/2021 | ......... | G06F 16/2428 |

OTHER PUBLICATIONS

Cheng, Zhoujun, et al. "Fortap: Using formulas for numerical-reasoning-aware table pretraining." arXiv preprint arXiv:2109.07323 vol.2 (Mar. 26, 2022) pp. 1-17.
(Continued)

*Primary Examiner* — Monica M Pyo
(74) *Attorney, Agent, or Firm* — NSIP Law

(57) ABSTRACT

A method performed by an electronic device includes determining, based on a loss function comprises a processor computation cost comprising a power-consuming hyperparameter based on power consumed to access a memory when the processor trains the first neural network architecture, in response to a first search end condition not being satisfied, a first neural network architecture, generating a target neural network architecture used in a processor, based on a result of the determining of the first neural network architecture, and generating an output by providing an input to a neural network having the target neural network architecture that has been trained where the trained neural network has a same architecture as the target neural network architecture (Continued)

with balanced prediction performance and processor efficiency based on the loss function.

18 Claims, 6 Drawing Sheets

(58) Field of Classification Search
USPC .......................................................... 707/769
See application file for complete search history.

(56) References Cited

U.S. PATENT DOCUMENTS

| | | | | |
|---|---|---|---|---|
| 11,520,815 | B1 * | 12/2022 | Gutta | G06F 40/279 |
| 11,604,794 | B1 * | 3/2023 | Nallapati | G06F 16/24522 |
| 11,726,994 | B1 * | 8/2023 | Wang | G06F 16/24573 |
| | | | | 707/769 |
| 12,008,043 | B2 * | 6/2024 | Ramos | G06N 20/00 |
| 2017/0344654 | A1 * | 11/2017 | Wolfram | G06F 16/3344 |
| 2021/0150155 | A1 * | 5/2021 | Kim | H04L 51/02 |
| 2021/0191986 | A1 * | 6/2021 | Okajima | G06F 40/221 |
| 2021/0342684 | A1 * | 11/2021 | Shraga | G06N 3/045 |
| 2021/0357409 | A1 * | 11/2021 | Rodriguez | G06F 16/24553 |
| 2022/0044134 | A1 * | 2/2022 | Joy | G06N 3/045 |
| 2022/0253871 | A1 * | 8/2022 | Miller | G06F 16/36 |
| 2022/0309107 | A1 | 9/2022 | Sen et al. | |
| 2022/0374426 | A1 | 11/2022 | Thai et al. | |
| 2023/0134933 | A1 * | 5/2023 | Lee | G06N 3/08 |
| | | | | 706/45 |
| 2023/0342383 | A1 * | 10/2023 | Xia | G06F 16/3344 |
| 2024/0160953 | A1 * | 5/2024 | Manda | G06N 3/08 |
| 2025/0111192 | A1 * | 4/2025 | Bayless | G06N 3/006 |
| 2025/0139140 | A1 * | 5/2025 | Gopalan | G06F 16/3329 |

OTHER PUBLICATIONS

Zhou, Fan, et al. "Tacube: Pre-computing data cubes for answering numerical-reasoning questions over tabular data." arXiv preprint arXiv:2205.12682 vol. 1 (May 25, 2022) pp. 1-13.

* cited by examiner

Start

510

Determine reference item to identify entity of second data among plurality of
items of first data, based on header of first data and natural language question

520

In response to first data including plurality of entities having
the same item information assigned to reference item, generate one entity of
second data using plurality of entities End

METHOD AND DEVICE FOR GENERATING ANSWER TO NATURAL LANGUAGE QUESTION FOR DATA

CROSS-REFERENCE TO RELATED APPLICATIONS

This application claims the benefit under 35 U.S.C. § 119(e) of U.S. Provisional Application No. 63/548,017 filed on Nov. 10, 2023, in the U.S. Patent and Trademark Office, and claims the benefit under 35 USC § 119(a) of Korean Patent Application No. 10-2023-0179124, filed on Dec. 11, 2023, in the Korean Intellectual Property Office, the entire disclosure of which is incorporated herein by reference for all purposes.

BACKGROUND

1. Field

The following description relates to a method of generating an answer to a natural language question for data.

2. Description of Related Art

According to the related art, there have been attempts to solve a problem with a model generated by pre-training the model using (i) the formula existing in a spreadsheet and (ii) the calculation results as machine learning training data, generating the model, and then performing fine-tuning training on the model for an answer to a natural language question.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method performed by an electronic device includes: obtaining a natural language query for querying first data, the first data including entities and items, each entity including pieces of item information of the respective items; generating an additional item based on at least one item included in the first data, based on a header of the first data, and based on the natural language query, the header including indications of the items; generating, from the first data, second data including item information of the generated additional item; and outputting an answer to the natural language query by applying a question answering model to the second data and the natural language query.

The additional item may be generated based on detecting, from the natural language query, an operation on item information in an item included in the first data.

The generating of the additional item may further include: obtaining an operand of the detected operation; and determining, from among the items of the first data, an operand item corresponding to the obtained operand of the detected operation.

The generating of the additional item may further include determining item information that is in the additional item by applying the operation to item information in the determined operand item.

The method may further include: based on a data type of item information in an item of the first data being an unstructured data type, for each entity, converting the item information in the item into item information of a structured type.

The generating of the second data may include: determining filtering information based on the header of the first data and the natural language query; and extracting, from among candidate entities included in the entities of the first data, an entity related to the natural language query based on the determined filtering information.

The determining of the filtering information may include: determining a filtering item among the items of the first data; and determining a filtering condition for the determined filtering item, wherein the extracting of the entity related to the natural language query includes extracting, from among the candidate entities, an entity whose item information in the filtering item is determined to satisfy the filtering condition.

The generating of the second data may include determining, among the items of the first data, a reference item to identify an entity of the second data, wherein the determining is based on the header of the first data and the natural language query.

The generating of the second data may further include, based on some entities in the first data having the same item information in the reference item, generating a corresponding entity of the second data using the some entities.

The determining of the reference item may include determining reference items among the items of the first data, and the generating of the second data may further include, based on the first data including some entities having the same item information of all of the plurality of reference items, generating a corresponding entity of the second data using the some entities.

The items data may be a first table, the items may be columns of the first table, the entities may be records in the first table, the pieces of item information may be data values stored in the first table, the second data may be a second table, the additional item may be a column in the second table, and the question answering model may include a neural network.

In another general aspect, an electronic device includes: a processor configured to obtain a natural language query for querying first data, the first data including entities and items, each entity including pieces of item information of the respective items, generate an additional item based on at least one item included in the first data, based on a header of the first data, and based on the natural language query, the header including indications of the items, generate, from the first data, second data including item information of the generated additional item, and output an answer to the natural language query by applying a question answering model to the second data and the natural language query.

The processor may be configured to generate the additional item based on detecting, from the natural language query, an operation on item information in an item included in the first data.

The processor may be configured to: obtain an operand of the detected operation; and determine, from among the items of the first data, an operand item corresponding to the obtained operand of the detected operation.

The processor may be configured to determine item information that is in the additional item by applying the operation to item information in the determined operand item.

The processor may be configured to, based on a data type of item information in an item of the first data being an unstructured data type, for each entity, convert the item information in the item into item information of a structured type.

The processor may be configured to: determine filtering information based on the header of the first data and the natural language query; and extract, from among candidate entities included the entities in the first data, an entity related to the natural language query based on the determined filtering information.

The processor may be configured to: determine a filtering item from among the items of the first data; determine a filtering condition for the determined filtering item; and extract, from among the candidate entities, an entity whose item information in the filtering item satisfies the filtering condition.

The processor may be configured to determine, from among the items of the first data, a reference item to identify an entity of the second data based on the header of the first data and the natural language query.

The processor may be configured to, based on the first data including a plurality of entities having the same item information in the reference item, generate one entity of the second data using the plurality of entities.

Other features and aspects will be apparent from the following detailed description, the drawings, and the claims.

Figure 1:
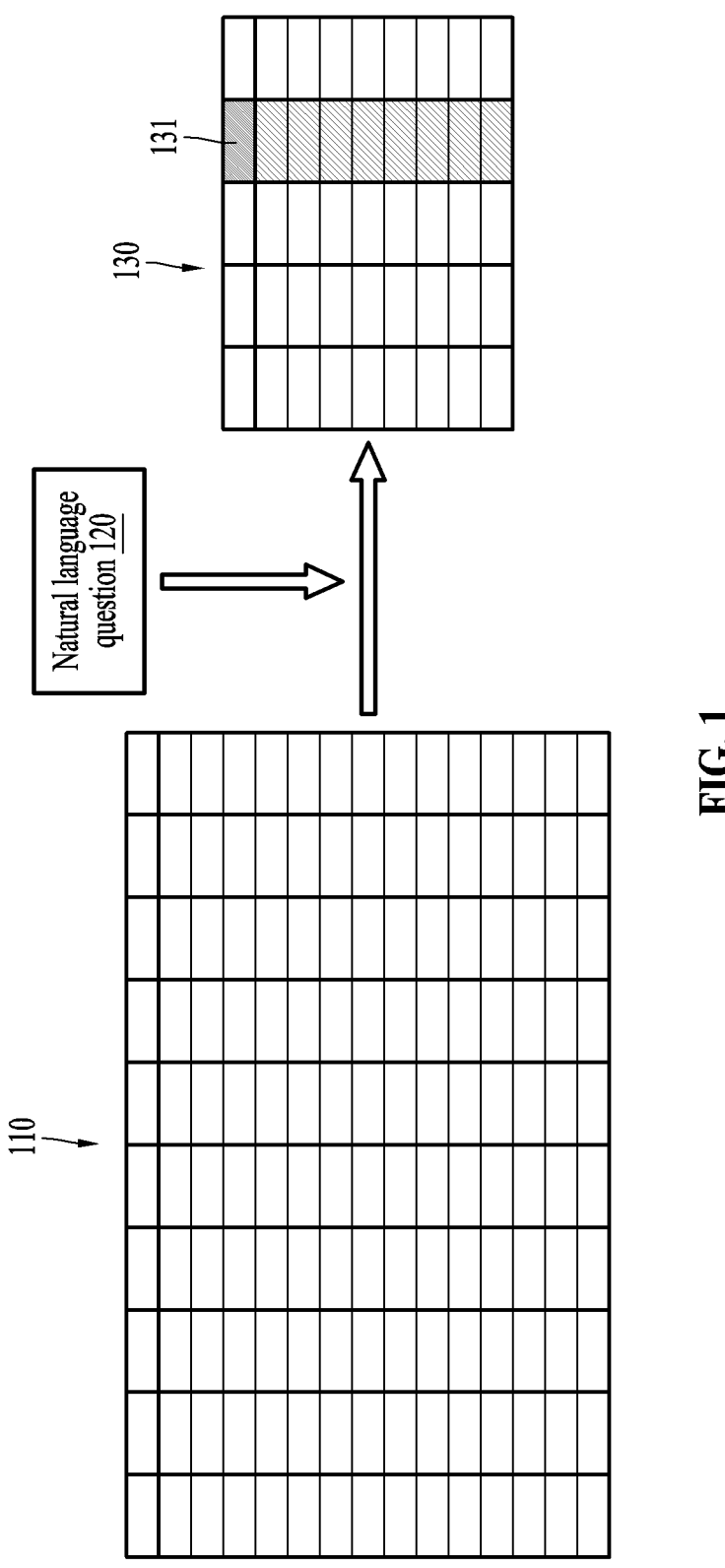
FIG. 1 illustrates an example of first data and second data, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

In the following description, a "data" (e.g., first and second data) may be a table, an "item" may be a column of a table, an "entity" may be a row/record of a table, an "item information" may be a value in a field of a row/record, and a "header" may be indications or descriptors of respective columns of a table. However, these are only examples and the aforementioned terms are not limited to these meanings.

FIG. 1 illustrates an example of first data and second data, according to one or more embodiments.

When a natural language question 120 that queries for information included in first data 110 is received by an electronic device, the electronic device may generate second data 130 from the first data 110.

The first data 110 may be raw data. The second data 130 may be obtained/derived from the first data 110 and may refer include information for generating an answer to the natural language question 120. The second data 130 may include information selected or generated from the first data 110. The second data 130 may include less information than the first data 110.

The first data 110 may include a large amount of information. The natural language question 120 may be a query for some of the information included in the first data 110 and/or additional information derived from the information included in the first data 110. An electronic device, as compared to examples and embodiments described herein, may perform training and/or inference on a question answering model to generate an answer to the natural language question 120 directly from the first data 110. Such a comparative electronic device may have degraded performance and/or poor efficiency due to the processing of information that is not necessary for generating an answer being in the first data 110 and/or the processing of deriving other information required for generating an answer from the information included in the first data 110. Alternatively, the electronic device may have improved performance and/or efficiency by generating the second data 130, from which the answer to the natural language question 120 may be answered, and the generating may be based on the first data 110 and the natural language question 120. Training and/or inference may be performed on the question answering model to generate the answer to the natural language question 120 from the second data 130.

The entities of the first data 110 and/or the second data 130 may include item information of the respective items of the corresponding data. An item may represent an individual feature and/or category that classifies or details information included in data. An entity may represent a unit of information in which the information included in the data is divided according to a reference. For example, the first data 110 and/or the second data 130 may include multiple entities, and each entity may include pieces of item information respectively assigned to (in) the items.

A reference for identifying an entity of the first data 110 may be different from a reference for identifying an entity of the second data 130. For example, the first data 110 may include information on sales of products to customers, and the entity of the first data 110 may correspond to a sales record. The entity of the second data 130 may correspond to a product. As described in more detail with reference to FIG. 5, multiple entries of the first data 110 may be used to generate one entity of the second data 130. For example, the entity of the first data 110 may correspond to a sales case of a product for a customer and the entity of the second data 130 may correspond to the product. When the first data 110 includes a first entity (e.g., corresponding to a sale of product X to customer A), a second entity (e.g., corresponding to a sale of product X to customer B), and a third entity (e.g., corresponding to a sale of product X to customer C), the entity (e.g., corresponding to product X) of the second data 130 may be generated based on the first entity, the second entity, and the third entity of the first data 110.

Item information on a certain item may be related to an item heading of the certain item. For example, item information representing the country of an entity including item information may be assigned to an item having the item heading "country."

The first data 110 may be different from the second data 130.

For example, the first data 110 and/or the second data 130 may be in a table format having rows and columns. Data in the table format may also be represented as tabular data. Rows in the table format may respectively correspond to entities. Columns in the table format may respectively correspond to items. The term "column" may be interpreted as being an item and the term "row" may be interpreted as being an entity.

The first data 110 and/or the second data 130 may have respective headers. The header may refer to item headings of a plurality of items of data. When the first data 110 and/or the second data 130 are in the table format, the header may also be referred to as a header row.

The method of generating the second data 130 is described in more detail below with reference to FIGS. 2 to 5.

Table 1 is an example of the first data 110 for a product review.

TABLE 1

| Cust. ID | Review ID | Product ID | Product Cat. | Country | Rating | Rev. Date | Rev. Year | Review Headline | Review Body |
|---|---|---|---|---|---|---|---|---|---|
| 32145 | A32HIG246215G | T3215WDF | Toys | US | 4 | Aug. 16, 2022 | 2022 | Four Stars | Super fast shipping |
| 68421 | D21QWE254213A | W5412WET | Shoes | KR | 5 | Sep. 26, 2022 | 2022 | Awesome | These shoes are so cute . . . |
| 34684 | C37SDF988432D | S9513QWE | Apparel | US | 2 | Feb. 16, 2023 | 2023 | Good but | This is to be expected |
| 96843 | E85WTG924832E | S5912SDL | Toys | CN | 4 | Jan. 30, 2022 | 2022 | Amazing! | Easy to assemble . . . |

TABLE 1-continued

| Cust. ID | Review ID | Product ID | Product Cat. | Country | Rating | Rev. Date | Rev. Year | Review Headline | Review Body |
|---|---|---|---|---|---|---|---|---|---|
| 65321 | B93GSD789241W | W5412WET | Shoes | US | 4 | Jan. 24, 2022 | 2022 | Great quality | These are lovely shoes . . . |
| 74823 | W45OLJ921846G | H2183SIK | Shoes | KR | 4 | Feb. 25, 2022 | 2022 | Really great product | I got this for my daughter . . . |

In Table 1, the first data 110 may include, for example, information related to product reviews. In the example, the items (columns) of the first data 110 include a customer identifier item, a review identifier item, a product identifier item, a product category item, a country item, a star rating item, a review date item, a review year item, and a review headline item, and a review body item. Each entity (row) of the first data 110 may correspond to an individual review of a product.

For example, the electronic device may obtain the natural language question 120 which might query for information related to the product review, "What is the product identifier with the highest average star rating in the shoe category in 2022?" The electronic device may generate the second data 130 to include information related to the natural language question 120, and may do so based on the first data 110 and the natural language question 120.

Continuing the example of Table 1, Table 2 is an example of the second data 130 generated based Table 1 as the first data 110 and based on the above-mentioned natural language question 120.

TABLE 2

| Product Identifier | Product Category | Average Star Rating | Review Year |
|---|---|---|---|
| W5412WET | Shoes | 4.5 | 2022 |
| H2183SIK | Shoes | 4 | 2022 |

In Table 2, the items of the second data 130 include, for example, a product identifier item, a product category item, a review year item, and an average star rating item. The average star rating item of the second data 130 may be an additional item 131 (i.e., a derivative item) generated based on the star rating item of the first data 110. Each entity of the first data 110 may have respectively corresponding item information of the product identifier item.

Figure 2:
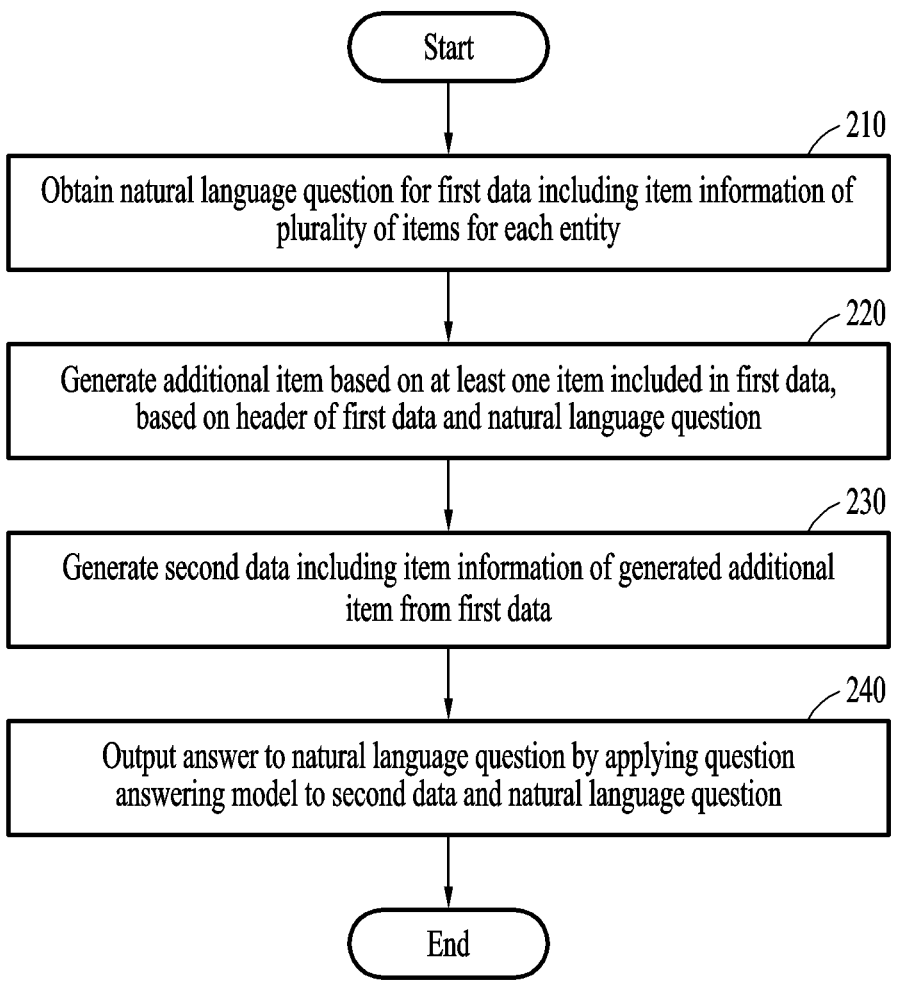
FIG. 2 illustrates an example of an electronic device generating an answer to a natural language question, according to one or more embodiments.

FIG. 2 illustrates an example of a method in which an electronic device generates an answer to a natural language question, according to one or more embodiments.

In operation 210, the electronic device may obtain a natural language question (e.g., the natural language question 120 of FIG. 1) for querying first data (e.g., the first data 110 of FIG. 1) that includes item information of items for each entity. As described above with reference to FIG. 1, the first data may include information on entities and each entity may include item information of each of the respective items. The first data may be in a data format (e.g., a table format/structure) according to the items and the plurality of entities.

The natural language question may query for information included in the first data using the data format of the first data. For example, the natural language question may query for information using item information corresponding to (e.g., comparable to) at least one of the items of the first data.

In operation 220, the electronic device may generate an additional item based on at least one item included in the first data, and may do so based on a header of the first data and the natural language question.

The additional item is an item other than the items of the first data and may refer to an item that may be derived based on at least one item among the items of the first data. The additional item may be an item required to answer the natural language question. For example, the additional item (or item information of the additional item) may be derived based on item information of one item (e.g., a target item) of the entities. For example, the additional item (or item information of the additional item) may be derived based on item information of items for one entity. For example, the additional item (or item information of the additional item) may be derived based on pieces of item information of items for the entities. As described in more detail in operation 230, the additional item may be used as one of the items of the second data.

The electronic device may generate the additional item through an operation on at least one item among the items of the first data. An operation in which the electronic device determines the additional item (and item information assigned to the additional item) through the operation is described in more detail below with reference to FIG. 2.

Further regarding the generation of the additional item in the second data, item information of additional item may be given a structured data type based on the data type of the target item (in the first data) having an unstructured type of data. More specifically, when item information of an unstructured type is assigned to the target item of the first data, the electronic device may convert the item information of the unstructured type into item information of a structured type. For example, the electronic device may convert each entity's item information of the target item into item information of a structured type, and the conversion may be based on the type of the item information of the item of the first data being the unstructured type. The electronic device may replace the item information of the unstructured type with the item information of the structured type. The electronic device may generate the additional item based on the first data of which the item information of the unstructured type is replaced with the item information of the structured type.

For example, the unstructured type may include an unstructured text type and the structured type may include a structured text type and/or a numerical type. A structured character string type may indicate that the structured character string type includes one or more text characters, and a rule for the letters is set. The text characters may include numbers, letters, or symbols. The rule for the characters may include, for example, having three numbers and two letters following the three numbers, for example, "321HE", "984WO", or "621 DK".

For example, the electronic device may determine whether to convert the item information of the unstructured type into the item information of the structured type based on a correlation between (i) the natural language question and (ii) an item having the item information of the unstructured type, and the comparison may be based on the natural language question and the header of the first data. When an item (i) having the item information of the unstructured type among the items of the first data and (ii) having a correlation with the natural language question is detected, the electronic device may perform conversion on item information of the detected (target) item. The correlation between the target item of the first data and the natural language question may be determined using a machine learning model or determined based on a keyword of the natural language question corresponding to the item. Even when a certain item has the item information of the unstructured type, the electronic device may skip the conversion of the item information when the certain item is determined to not be used/needed to generate an answer to the natural language question (e.g., when the correlation with the natural language question is less than or equal to a threshold).

For example, the electronic device may determine whether the type of item information assigned to an item is a structured type or an unstructured type based on metadata. For example, metadata of the first data (e.g., a schema of the first data) may indicate the type of item information assigned to each item of the first data.

The electronic device may convert the item information of the unstructured type into the item information of the structured type using a machine learning model (e.g., a neural network). The machine learning model may include a model generated and/or trained to output output data corresponding to (and indicating) the item information of the structured type by being applied to input data corresponding to the item information of the unstructured type. For example, the electronic device may determine an item on which conversion of item information is to be performed. The electronic device may obtain the input data based on the item information of the unstructured type of each entity. The electronic device may obtain the output data indicating the item information of the structured type from the item information of the unstructured type and by applying the machine learning model to the input data. The electronic device may determine the item information of the structured type based on the output data.

In operation 230, the electronic device may generate second data (e.g., the second data 130 of FIG. 1) including item information of the additional item generated from the first data.

The second data may include item information of the items for each entity. As described above with reference to FIG. 1, the entity and item of the first data may be different from a corresponding entity and item of the second data. As described below with reference to FIGS. 3 to 5, the entity, item, and/or item information of the second data may be determined through filtering and/or clustering on entities of the first data, where the clustering is performed based on the natural language question.

In operation 240, the electronic device may output the answer to the natural language question by applying the question answering model to the second data and the natural language question.

The question answering model may be a model generated and/or trained to output output data (which corresponds to the answer to the natural language question) by being applied to data (e.g., the second data) and to input data corresponding to the natural language question. The question answering model may be implemented based on a machine learning model (e.g., a neural network) and/or a large language model (LLM).

The electronic device may generate text data corresponding to the answer to the natural language question. The electronic device may display, on a display, a graphic object generated based on the text data.

The electronic device may generate sound data corresponding to the answer to the natural language question. For example, the electronic device may convert the text data for the answer into sound data. The electronic device may play the sound data corresponding to the answer through a speaker.

Figure 3:
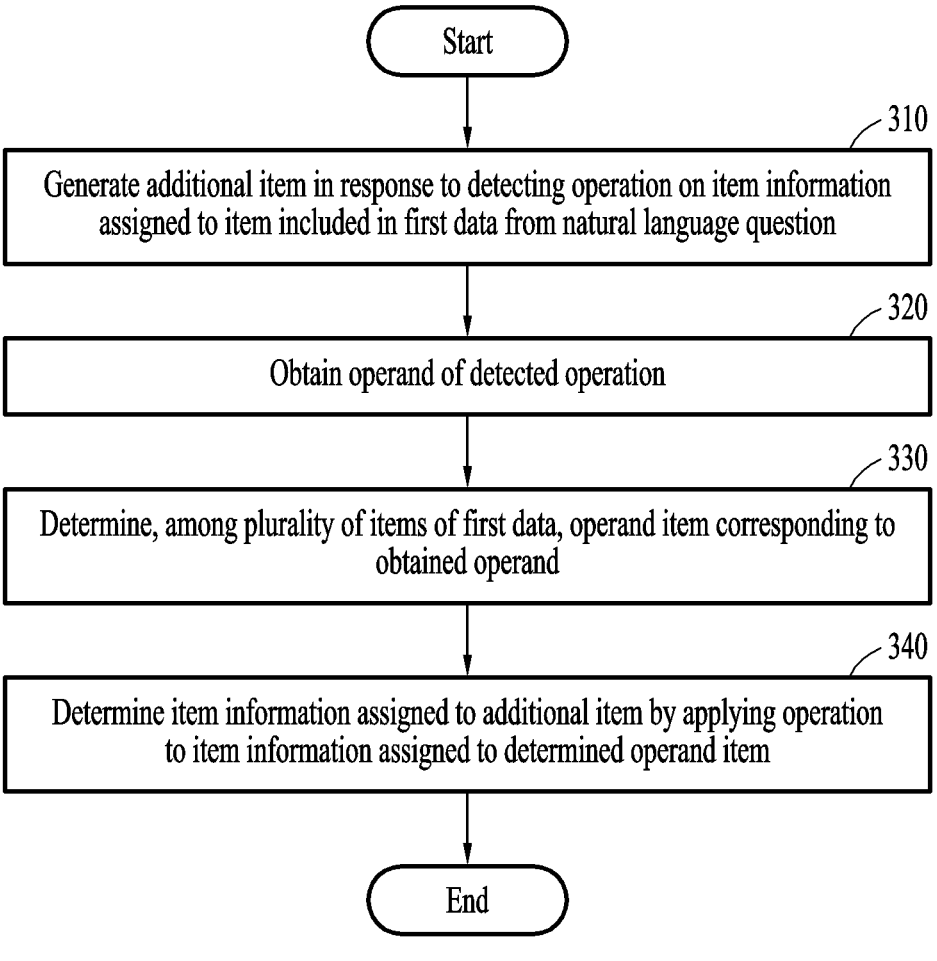
FIG. 3 illustrates an example of an electronic device determining an additional item and item information of the additional item, according to one or more embodiments.

FIG. 3 illustrates an example of an operation in which an electronic device determines an additional item and item information of the additional item, according to one or more embodiments.

Through operations 310 to 340, the electronic device may generate an additional item (e.g., the additional item 131 of FIG. 1) and/or item information of the additional item required to generate an answer to a natural language question (e.g., the natural language question 120 of FIG. 1) from first data (e.g., the first data 110 of FIG. 1).

In operation 310, the electronic device may generate, from the natural language question, the additional item in response to detecting a target operation on item information of an item included in the first data.

The target operation may involve calculating on operands according to a certain rule. For example, the target operation may be an arithmetic operation, a logical operation, or a comparison operation.

The electronic device may detect a target operation by detecting a keyword corresponding to the operation from the natural language question. For example, the keyword corresponding to the operation may include "addition," "subtraction," "average," "maximum" (or "the largest"), "minimum" (or "the smallest"), or any other word or phrase that can be mapped to an operation (most operations have natural language equivalents).

However, the electronic device is not limited to detecting an operation based on a keyword. The electronic device may obtain output data obtained by applying a machine learning model (e.g., a neural network) to input data such as the natural language question and/or headings of the first data. The electronic device may detect and/or specify the target operation based on the output data.

The target operation (or operation information) and/or the keyword corresponding to the operation may be set based on an input of a user. For example, the user of the electronic device may add the operation information (e.g., an equation) to determine an index defined by the user.

For example, the header of the first data may indicate that items of the first data include a customer identifier item, a review identifier item, a product identifier item, a product category item, a country item, a star rating item, a review date item, a review year item, a review headline item, and a review body item. The electronic device may obtain the natural language question, "What is the product identifier with the highest average star rating in the shoe category in 2022?" The electronic device may detect an average operation as a target operation based on the natural language question and the header of the first data.

In operation 320, the electronic device may obtain an operand of the detected target operation.

As noted, the electronic device may obtain operation information of an operation to obtain the additional item to be generated, and may do so based on the header of the first data and the natural language question. The operation information may include information on an operator and operand of the operation (there may be multiple operators and operands, but singulars of the same are used for explanation). For example, the operation information may include information on an equation to determine the item information of the additional item.

For example, the electronic device may obtain operation information of the average operation based on detecting the average operation in the natural language question/query. For example, the electronic device may obtain a first operand (e.g., the sum of observations) and a second operand (e.g., the number of observations) of the average operation.

The operation information may indicate the operand for the operation differently from the item of the first data (e.g., more ambiguously than the item of the first data, or, without constraint to the item of the first data). For example, with word "observation" being used to indicate a placeholder or a generic operand, the electronic device may detect the average operation based on the natural language question being related to the average star rating, but the operation information of the average operation may only designate the sum as a "sum of observations" and the number as a "number of observations"; the electronic device may not designate that the observation corresponds to the item of the first data, "star rating."

In operation 330, the electronic device may determine, among the items of the first data, an operand item corresponding to (i.e., to be used as an operand of) the obtained operand.

As noted, the electronic device may determine, among the items of the first data, an operand item corresponding to the determined operand. If there are multiple determined operands, each operand may correspond to one item or may correspond to multiple items. Similarly, multiple operands may correspond to one item.

For example, the electronic device may determine the item "star rating" to be an operand item corresponding to the first operand (e.g., the sum of observations) and the second operand (e.g., the number of observations).

In operation 340, the electronic device may determine item information assigned to the additional item by applying an operation to item information assigned to the determined operand item.

Specifically, the electronic device may determine one entity (or multiple entities) of the first data to be an entity set. Multiple entity sets may be determined. An entity set may correspond to one entity of second data (e.g., the second data 130 of FIG. 1). As described with reference to FIGS. 4 and 5, item information of an entity of the first data included in an entity set may be used to generate corresponding item information of one entity of the second data. The determining of the entity set(s) and/or obtaining of an entity (or entities) of the second data is described with reference to FIGS. 4 and 5.

The electronic device may generate an item information of the additional item from each respective entity set. For example, the electronic device may generate item information of the additional item for each entity of the second data. The electronic device may determine an item information of an additional item for the entity of the second data corresponding to an entity set by applying an operation to item information of the operand item in the entity set.

For example, the electronic device may determine entity A, entity B, and entity C of the first data to be one entity set. Item information of the item "star rating" for the entity A may be 3, item information of the item "star rating" for the entity B may be 5, and item information of the item "star rating" for the entity C may be 3. The electronic device may determine that item information of the item "average star rating" for entity X of the second data is 3.67 by applying an average operation to the pieces of item information of the item "star rating" for the entity A, the entity B, and the entity C in the entity set.

Figure 4:
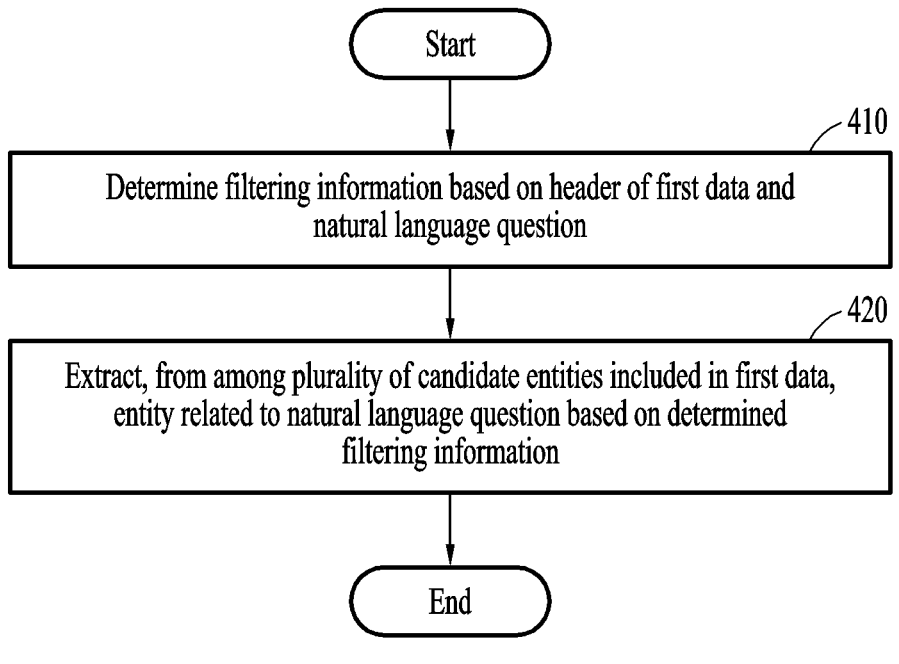
FIG. 4 illustrates an example of an electronic device filtering entities of first data, according to one or more embodiments.

FIG. 4 illustrates an example of an operation in which an electronic device filters a entities of first data, according to one or more embodiments.

An electronic device may filter entities of first data (e.g., the first data 110 of FIG. 1) based on a natural language question (e.g., the natural language question 120 of FIG. 1) and may generate second data (e.g., the second data 130 of FIG. 1) based on entities related to the natural language question.

In operation 410, the electronic device may determine filtering information based on a header of the first data and the natural language question. The filtering information may be used to determine (select) an entity related to the natural language question among candidate entities of the first data.

The filtering information may include a filtering item and a filtering condition for the filtering item. The filtering item is at least one item of the first data and may its item information is used to determine/selecting an entity to be used for generating the second data among the candidate entities of the first data. The filtering condition is a condition for item information of the filtering item. For example, the electronic device may determine/select the filtering item from among the items of the first data. The electronic device may determine the filtering condition for the determined filtering item. The filtering condition may include information on a filtering operator and a filtering value.

For example, the header of the first data may indicate that the items of the first data include a customer identifier item, a review identifier item, a product identifier item, a product category item, a country item, a star rating item, a review date item, a review year item, a review headline item, and a review body item. The electronic device may obtain the natural language question, "What is the product identifier with the highest average star rating in the shoe category in 2022?"

The electronic device may determine, from the natural language question, the item "review year" to be the filtering item and may determine the filtering condition for the item "review year" to be the filtering operator (e.g., =) and the filtering value (e.g., 2022). The electronic device may determine the item "product category" to be another filtering item and may determine the filtering condition for the item "product category" to be the filtering operator (e.g., =) and the filtering value (e.g., shoes).

It is mainly described that the filtering information is extracted for each filtering item. However, examples are not limited thereto. The electronic device may determine the filtering condition for multiple filtering items. For example, the electronic device may determine a filtering condition for a first filtering item and a second filtering item. For example, the filtering condition may be determined by the relationship (e.g., the size relationship between item information of the first filtering item and item information of the second filtering item, whether item information of the first filtering item and item information of the second filtering item are the same, etc.) between item information of the first filtering item and item information of the second filtering item.

For example, the electronic device may determine a partial filtering condition for the filtering items and may determine a filtering condition based on the partial filtering condition. For example, the filtering condition may be determined by a logical sum operation (e.g., OR operation) between a first partial filtering condition (e.g., the item information of the first filtering item is the same as A) for the first filtering item and a second partial filtering condition (e.g., the item information of the second filtering item is the same as X) for the second filtering item.

The electronic device may obtain the filtering information using a filtering information determination model. The filtering information determination model may be generated and/or trained to output the filtering information by being applied to the header of the first data and the natural language question. The filtering information determination model may be implemented as a model based on a machine learning model (e.g., a neural network). For example, the electronic device may form, as input data, a representation of the header of the first data and the natural language question. The electronic device may output output data corresponding to the filtering information by applying the filtering information determination model to the input data. The electronic device may determine the filtering information (e.g., the filtering item, the filtering condition, the filtering item, and/or the number of filtering conditions) as indicated by the output data.

In operation 420, the electronic device may extract, from among the candidate entities included in the first data, an entity related to the natural language question based on the determined filtering information. That is to say, the electronic device may extract, from among the candidate entities included in the first data, any entities whose item information in the filtering item satisfies the filtering condition.

The electronic device may generate the second data based on the extracted entities of the first data. The electronic device may exclude, from generating the second data, an unextracted entity (e.g., an entity different from the extracted entity) of the first data.

Figure 5:
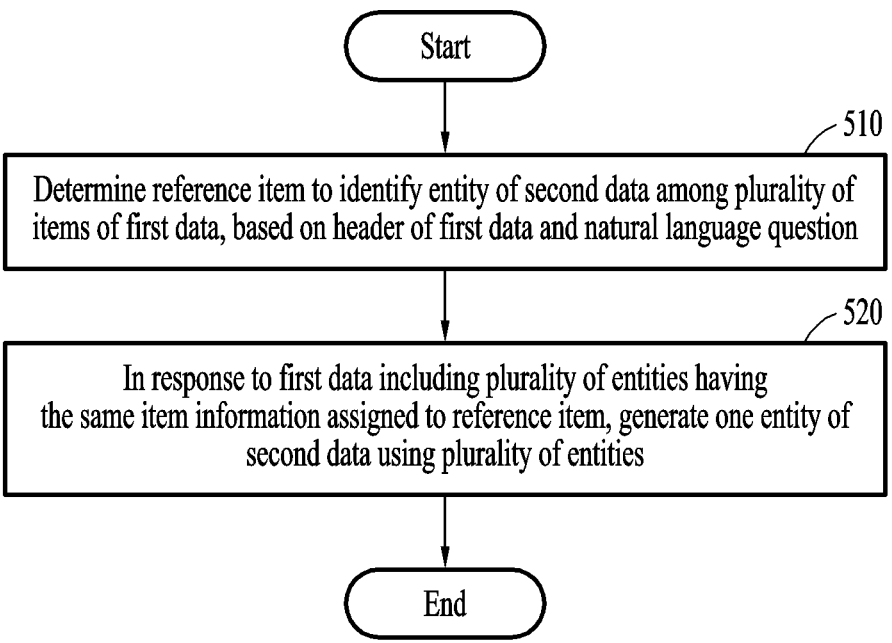
FIG. 5 illustrates an example of an electronic device generating an entity of second data based on entities extracted from first data, according to one or more embodiments.

FIG. 5 illustrates an example of an operation in which an electronic device generates an entity of second data based on entities extracted from first data, according to one or more embodiments.

The electronic device may determine a reference item based on a natural language question (e.g., the natural language question 120 of FIG. 1) among items of first data (e.g., the first data 110 of FIG. 1) and may generate an entity of second data (e.g., the second data 130 of FIG. 1) based on item information of the reference item. The notion of a reference item is analogous to a key of a query, an index of a table, etc. For example, a reference item may be used to identify entities and may have, for example.

In operation 510, the electronic device may determine a reference item to identify the entity of the second data among the items of the first data, and may make such determination based on a header of the first data and the natural language question.

The reference item is at least one item among the items of the first data and may be used to define the entity of the second data. For example, when the reference item is determined to be the item "product identifier," each entity of the second data may correspond to a product (e.g., each may have a product identifier). In another example, when the reference item is determined to be the item "customer identifier," each entity of the second data may correspond to a customer (e.g., each may have a customer identifier). In another example, when the reference item is determined to be both the item "product identifier" and also the item "review year," each entity of the second data may correspond to a product by year (e.g., product A in 2021, product A in 2022, product A in 2023, and product B in 2022).

For example, the header of the first data may indicate that the items of the first data include a customer identifier item, a review identifier item, a product identifier item, a product category item, a country item, a star rating item, a review date item, a review year item, a review headline item, and a review body item. The electronic device may obtain the natural language question, "What is the product identifier with the highest average star rating in the shoe category in 2022?" The electronic device may determine the item "product identifier" to be the reference item based on the header of the first data and the natural language question.

Specifically, the electronic device may obtain the filtering information using a reference item determination model. The reference item determination model may be generated and/or trained to output output data indicating the reference item by being applied to input data that includes the header of the first data and the natural language question. The reference item determination model may be implemented as a model based on a machine learning model (e.g., a neural network). For example, the electronic device may generate the input data corresponding to (or as) the header of the first data and the natural language question. The electronic device may output the output data corresponding to the reference item by applying the reference item determination model to the input data. The electronic device may determine the filtering information (e.g., the number of reference items and item headings of the reference items) indicated by the output data.

The reference item determination model may be implemented as a model trained together with the filtering information determination model. For example, the reference item determination model and the filtering information determination model may be generated and/or trained as one integrated model that outputs the output data indicating the filtering information and indicating the reference item, and may do so by being applied to the input data in the form of the header of the first data and the natural language question. The output data of the integrated model is the filtering information and may include the number of filtering items, an identifier indicating the filtering item (e.g., the item heading of the filtering item), or the filtering condition (e.g., a filtering operator and a filtering value) for the filtering item, and the output data may include, as information on the reference item, the number of reference items or an identifier indicating the reference item (e.g., the item heading of the reference item). In short, the integrated model may, for a given header of structured data (e.g., tabular) and a given natural language query/question directed to the structured data, predict filtering information and reference information for carrying out the natural language question on data corresponding to the header (e.g., the first data).

In operation 520, based on the first data including multiple entities each having a same item information for the reference item, the electronic device may generate one entity of the second data using the plurality of entities. For example, a combination of entity deduplication, entity consolidation, and the like may be used.

As described above with reference to FIG. 4, the electronic device may extract, from among candidate entities of the first data, entities related to the natural language question based on the filtering information.

The electronic device may cluster the extracted entities into entity sets based on the extracted entities' pieces of item information of the reference item. As noted above, an entity set is a set of entities including one or more entities of the first data and may serve as a unit used to generate an entity of the second data. The entity set may be identified by the item information of the reference item. One entity set may include entities extracted from the first data having the same item information of the reference item. For example, item information of a reference item of a first entity in the entity set may be the same as item information of a reference item of a second entity in the same entity set. In sum, entities in the first data may be formed into groups (formed into entity sets) by respective commonalities, and the entity sets/groups may be mapped to respective entities in the second data.

The electronic device may determine reference items among the items of the first data. The electronic device may cluster/group entities of the first data into entity sets where each entity in a given entity set has the same item information of all of the reference items. When item information of at least one item among the reference items for a first entity (among the entities of the first data) is different from at least one piece of item information of a second entity, the electronic device may cluster the first entity and the second entity into different entity sets.

For example, based on the first data including multiple entities having the same item information of all of the reference items, the electronic device may generate one entity of the second data using those entities. Based on item information of one reference item among the reference items of a first entity of the first data being different from the corresponding item information of one reference item of the second entity of the first data, the electronic device may respectively use the first entity and the second entity to generate different entities of the second data.

The electronic device may generate an entity of the second data from the entity (or entities) of the first data included in one entity set. The electronic device may determine the reference item and an additional item to be items of the second data.

The electronic device may determine the reference item, the additional item, and the filtering item to be items of the second data.

The electronic device may determine item information of items of the second data for an entity of the second data based on the natural language question. For example, the electronic device may determine/set an item of the second data to be the reference item (e.g., the item "product identifier"), another to be the filtering item (e.g., the item "review year" and the item "product category"), and another to be the additional item (e.g., the item "average star rating"), and may do so based on the natural language question, "What is the product identifier with the highest average star rating in the shoe category in 2022?" The electronic device may determine item information of the item "average star rating" from one or more entities of the first data included in the entity set based on operation information detected from the natural language question. In short, the various specific items of the second data may be set to the corresponding various items determined previously by the integrated model.

The electronic device may determine a remark item corresponding to the filtering information to be an item of the second data. The remark item may refer to an item indicating whether the filtering condition (or the partial filtering condition) is satisfied when pieces of item information of the filtering item of the entities that satisfy the filtering condition are different from each other. For example, when the filtering item is the item "review year" and the filtering condition is "2022 or higher," item information of the item "review year" of the entities included in the entity set may be either 2022 or 2023. In this case, it may be difficult to express different pieces of item information of the filtering item as item information on one entity of second data. The electronic device may generate the remark item (e.g., the item "whether the review year 2022 or higher is satisfied") corresponding to the filtering information of the second entity and may determine item information (e.g., "satisfied" or a value indicating whether to satisfy filtering condition) of the remark item. For example, when the pieces of item information of the filtering item for at least two entities among the entities in the entity set are different from each other, the electronic device may determine the remark item corresponding to the filtering item to be the item of the second entity.

Figure 6:
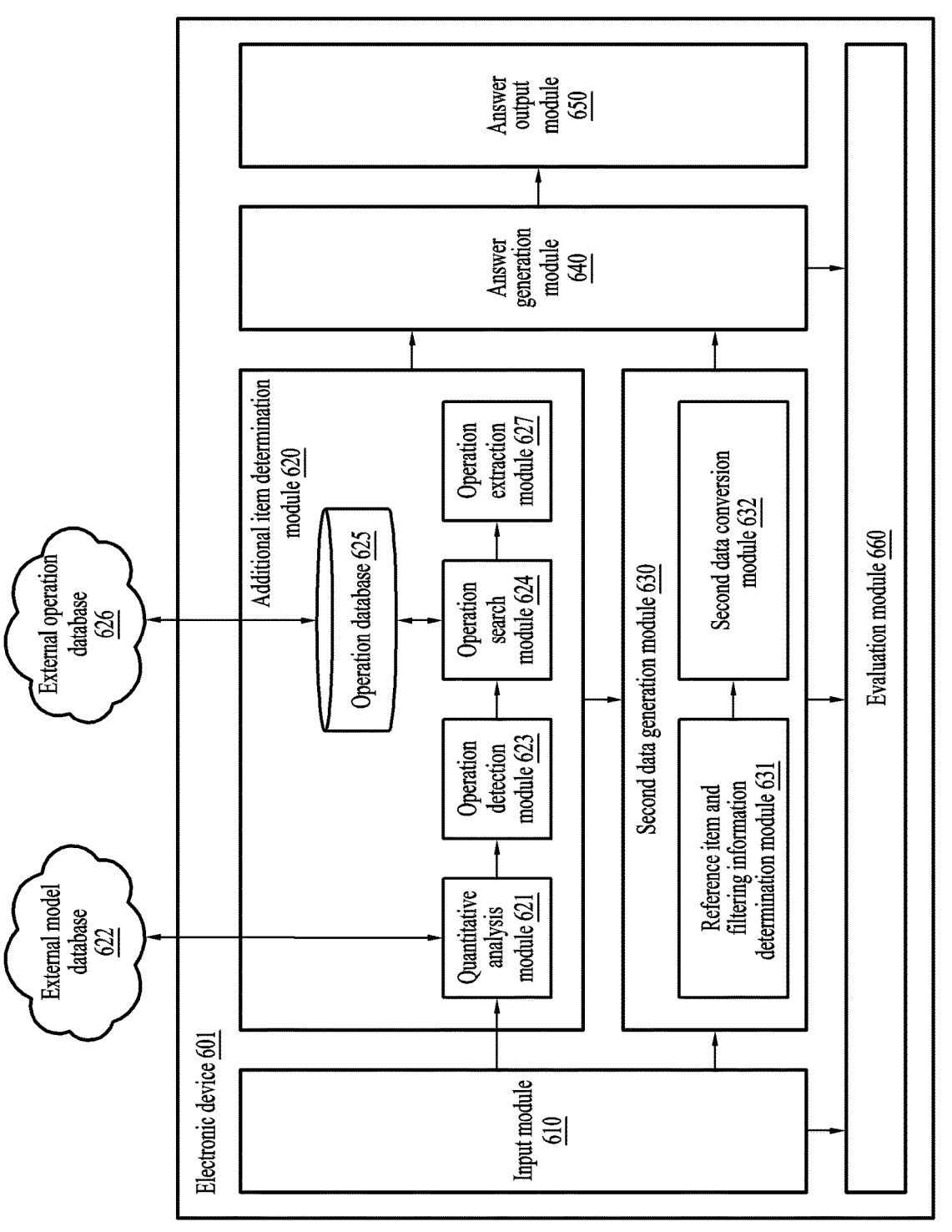
FIG. 6 illustrates an example configuration of an electronic device, according to one or more embodiments.

FIG. 6 illustrates an example of a configuration of an electronic device, according to one or more embodiments.

An electronic device 601 may include an input module 610, an additional item determination module 620, a second data generation module 630, an answer generation module 640, an answer output module 650, and an evaluation module 660.

The input module 610 may obtain a user input in the form of a natural language question related to first data. The input module 610 may transmit at least a portion of the first data (e.g., a header of the first data) and the natural language question to an additional item determination module 620 and a second data generation module 630. For example, the input module 610 may transmit a header of the first data and the natural language question to the additional item determination module 620. The input module 610 may transmit the first data and the natural language question to the second data generation module 630.

The additional item determination module 620 may include a quantitative analysis module 621, an operation detection module 623, an operation search module 624, an operation extraction module 627, and an operation database 625. The additional item determination module 620 may obtain the header of the first data and the natural language question from the input module 610. The additional item determination module 620 may determine a process for generating an additional item and item information of the additional item, based on the header of the first data and the natural language question.

For example, the quantitative analysis module 621 may convert item information of an unstructured type among items of the first data into item information of a structured type. The quantitative analysis module 621 may store a conversion model that converts the item information of the unstructured type into the item information of the structured type in the quantitative analysis module 621 and/or may obtain and use the conversion model of an external model database 622. The quantitative analysis module 621 may transmit, to the operation detection module 623, the first data of which the item information of the unstructured type of the first data is replaced with the item information of the structured type.

The operation detection module 623 may detect an operation from the header of the first data and the natural language question. The operation detection module 623 may transmit information on the detected operation to the operation search module 624. The operation search module 624 may search for operation information of the operation detected from the operation search module 624. The operation search module 624 may search for an operation detected from the operation database 625 in the additional item determination module 620 and/or may search for an operation detected from an external operation database 626. The operation search module 624 may obtain the operation information (e.g., an operator and operand). The operation search module 624 may transmit the operation information to the operation extraction module 627. The operation extraction module 627 may determine an operand item corresponding to an operand of the operation search module 624. The additional item determination module 620 may transmit a result processed by the additional item determination module 620 to the second data generation module 630 and to the answer generation module 640.

The second data generation module 630 may include a reference item and filtering information determination module 631 and a second data conversion module 632. The reference item and filtering information determination module 631 may determine a reference item among the plurality of items of the first data based on the natural language question and may determine filtering information to select an entity related to the natural language question from among entities of the first data. The reference item and filtering information determination module 631 may determine the reference item and the filtering information on the second data conversion module 632. The second data conversion module 632 may extract entities to be used to generate an entity of the second data among candidate entities of the first data based on the filtering information. The second data conversion module 632 may cluster the extracted entities into an entity set. The second data conversion module 632 may determine an item of the second data. The second data conversion module 632 may generate the entity of the second data by generating item information of the item of the second data corresponding to the entity set. For example, the second data conversion module 632 may determine item information of an additional item for each entity of the second data based on the operation information and/or operand item obtained from the additional item determination module 620. The second data generation module 630 may transmit the generated second data to the answer generation module 640 and the evaluation module 660.

The answer generation module 640 may obtain the natural language question from the input module 610 and may obtain the second data from the second data generation module 630. The answer generation module 640 may generate an answer (e.g., a natural language answer) to the natural language question based on the natural language question and the second data using the question answering model. The answer generation module 640 may transmit the generated answer to the answer output module 650.

The answer output module 650 may display a graphical representation based on the answer on a display or may play sound data based on the answer through a speaker.

The evaluation module 660 may evaluate the answer generated from the second data and/or the natural language question. The evaluation module 660 may obtain the natural language question and the first data from the input module 610. The evaluation module 660 may obtain the second data from the second data generation module 630. The evaluation module 660 may obtain the answer from the answer generation module 640.

An electronic device may include a processor, a memory, and a communicator. The processor may obtain the first data and the natural language question. The processor may generate the additional item based on the header of the first data and the natural language question. The processor may generate the second data including the item information of the additional item from the first data. The processor may output the answer to the natural language question by applying the question answering model to the second data and the natural language question.

The memory may temporarily and/or permanently store at least one of the first data, the natural language question, the additional item, or the second data. The memory may store instructions for obtaining the natural language question, generating the additional item, generating the second data, and/or outputting the answer to the natural language question. However, this is only an example, and the information stored in the memory is not limited thereto.

The communicator may transmit and receive at least one of the first data, the natural language question, the additional item, or the second data to and from external device. The communicator may establish a wired communication channel and/or a wireless communication channel with an external device (e.g., another electronic device or a server) and may, for example, establish communication with the external device through cellular communication, short-range wireless communication, local area network (LAN) communication, Bluetooth, wireless fidelity (Wi-Fi) direct or infrared data association (IrDA), or a long-range communication network such as a legacy cellular network, a fourth generation (4G) and/or fifth generation (5G) network, next generation communication, the Internet, or a computer network (e.g., a LAN or wide area network (WAN)).

The examples described herein may be implemented using a hardware component, a software component, and/or a combination thereof. A processing device may be implemented using one or more general-purpose or special-purpose computers, such as, for example, a processor, a controller, an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will appreciate that a processing device may include multiple processing elements and/or multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media (not a signal per se) including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The computing apparatuses, the electronic devices, the processors, the memories, the displays, the information output system and hardware, the storage devices, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media.

Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method performed by an electronic device, the method comprising:
  obtaining, a natural language query for querying first data, the first data comprising a plurality of entities, where each entity comprises item information for an item of a plurality of items, where an item represents a feature and the item information represents a value of a respective feature;
  generating, based on the natural language query and based on a header of the first data comprising item headings of the plurality of items in the first data, an additional item that is not in the first data, the additional item is related to at least one item in the first data, wherein the generating of the additional item comprising;
    determining, from the natural language query, an operation to be performed on item information of the at least one item in the first data;
    determining, from among the items in the first data, based on the determined operation, an operand item corresponding to an operand of the determined operation; and
    generating item information of the additional item by applying the operation to item information of the operand item; and
  generating, from the first data, based on the item information of the generated additional item, second data comprising the item information of the generated additional item;

generating an answer to the natural language query by applying a question answering neural network model to the generated second data and the natural language query; and
  outputting the answer to the natural language query via the electronic device.

2. The method of claim 1, further comprising:
  based on a data type of item information in an item of the first data being an unstructured data type, for each entity, converting the item information in the item into item information of a structured type.

3. The method of claim 1, wherein the generating of the second data comprises:
  determining filtering information based on the header of the first data and the natural language query; and
  determining, from among candidate entities comprised in the entities of the first data, an entity related to the natural language query based on the determined filtering information.

4. The method of claim 3, wherein the determining of the filtering information comprises:
  determining a filtering item among the items of the first data; and
  determining a filtering condition for the determined filtering item,
  wherein the determining of the entity related to the natural language query comprises determining, from among the candidate entities, an entity whose item information in the filtering item is determined to satisfy the filtering condition.

5. The method of claim 1, wherein the generating of the second data comprises determining, among the items of the first data, based on the header of the first data and the natural language query, a reference item to identify an entity of the second data.

6. The method of claim 5, wherein the generating of the second data further comprises, based on some entities in the first data having same item information in the reference item, generating a corresponding entity of the second data using the some entities.

7. The method of claim 5, wherein
  the determining of the reference item comprises determining reference items among the items of the first data, and
  the generating of the second data further comprises, based on the first data comprising some entities having the same item information of all of the reference items, generating a corresponding entity of the second data using the some entities.

8. The method of claim 1, wherein an entity represents a unit of information, and
  wherein the second data comprises the additional item.

9. The method of claim 1, wherein the item information of the additional item is not present in the first data.

10. The method of claim 1, wherein the second data is smaller in size than the first data and comprises only responsive items to the natural language query.

11. The method of claim 1, wherein the generating of the second data based on the item information of the additional item enables identification of relevant entities without processing of all the entities in the first data.

12. A non-transitory computer-readable storage medium storing instructions that, when executed by a processor, cause the processor to perform the method of claim 1.

13. An electronic device comprising:
  one or more processors; and a memory comprising one or more non-transitory storage media that store instructions that, when executed by the one or more processors, configures the device to:

obtain, a natural language query for querying first data, the first data comprising a plurality of entities, where each entity comprises item information for an item of a plurality of items, where an item represents a feature and the item information represents a value of a respective feature;

generate, based on the natural language query, and based on a header of the first data comprising item headings of the plurality of items in the first data, an additional item related to at least one item in the first data but not presence in the first data, the generation of the additional item comprising:

determining, from the natural language query, an operation to be performed on item information of the at least one item in the first data;

determining, from among the items in the first data, based on the determined operation, an operand item corresponding to an operand of the determined operation; and generating item information of the additional item by applying the operation to item information of the operand item;

generate, from the first data, based on the item information of the generated additional item, second data comprising the item information of the generated additional item;

generate an answer to the natural language query by applying a question answering neural network model to the generated second data and the natural language query; and output the answer to the natural language query via the electronic device.

14. The electronic device of claim 13, wherein the execution of the instructions further configures the electronic device to, based on a data type of item information in an item of the first data being an unstructured data type, for each entity, convert the item information in the item into item information of a structured type.

15. The electronic device of claim 13, wherein the execution of the instructions further configures the electronic device to:

determine filtering information based on the header of the first data and the natural language query; and determine, from among candidate entities comprised the entities in the first data, an entity related to the natural language query based on the determined filtering information.

16. The electronic device of claim 15, wherein the execution of the instructions further configures the electronic device to:

determine a filtering item from among the items of the first data;

determine a filtering condition for the determined filtering item; and determine, from among the candidate entities, an entity whose item information in the filtering item satisfies the filtering condition.

17. The electronic device of claim 13, wherein the execution of the instructions further configures the electronic device to determine, from among the items of the first data, based on the header of the first data and the natural language query, a reference item to identify an entity of the second data.

18. The electronic device of claim 17, wherein the execution of the instructions further configures the electronic device to, based on the first data comprising a plurality of entities having same item information in the reference item, generate one entity of the second data using the plurality of entities.

* * * * *